United States Patent
Hannan

(10) Patent No.: US 10,332,150 B2
(45) Date of Patent: Jun. 25, 2019

(54) LOCATION EVENT ADVERTISING

(71) Applicant: Facebook, Inc., Menlo Park, CA (US)

(72) Inventor: Scott Hannan, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 557 days.

(21) Appl. No.: 13/846,442

(22) Filed: Mar. 18, 2013

(65) Prior Publication Data

US 2013/0218683 A1    Aug. 22, 2013

Related U.S. Application Data

(62) Division of application No. 13/105,708, filed on May 11, 2011, now abandoned.

(60) Provisional application No. 61/333,547, filed on May 11, 2010.

(51) Int. Cl.
*G06Q 30/02* (2012.01)

(52) U.S. Cl.
CPC ............................... *G06Q 30/0261* (2013.01)

(58) Field of Classification Search
CPC .... G06Q 30/00; G06Q 30/02; G06Q 30/0241; G06Q 30/0251; G06Q 30/0261
USPC ........................................ 707/774; 701/408
See application file for complete search history.

(56) References Cited

U.S. PATENT DOCUMENTS

| | | | |
|---|---|---|---|
| 8,396,888 B2 * | 3/2013 | Cheng et al. | 707/774 |
| 2010/0036718 A1 | 2/2010 | Hamilton, II et al. | |
| 2010/0198503 A1 * | 8/2010 | Beckner | G06F 17/30241 701/408 |
| 2010/0241944 A1 | 9/2010 | Athsani et al. | |
| 2010/0291907 A1 | 11/2010 | MacNaughtan et al. | |
| 2012/0123830 A1 | 5/2012 | Svendsen et al. | |

OTHER PUBLICATIONS

Li, N. et al., Sharing Location in Online Social Networks, IEEE Network, Sep./Oct. 2010, pp. 20-35.
United States Office Action, U.S. Appl. No. 13/105,708, dated May 1, 2017, twenty-one pages.
United States Office Action, U.S. Appl. No. 13/105,708, dated Sep. 7, 2017, twenty-one pages.
United States Office Action, U.S. Appl. No. 13/105,708,, dated Aug. 13, 2018, twenty-one pages.

* cited by examiner

*Primary Examiner* — Marilyn G Macasiano
(74) *Attorney, Agent, or Firm* — Fenwick & West LLP

(57) ABSTRACT

Information about physical places is gathered to develop quality scores for targeting advertisements to users of mobile devices sharing geographic location events with service providers. A scoring model incorporates selected attributes about places (e.g., created by a service provider vs. user-generated, category, keywords, census data providing population density by location, property values by area, popularity, special events, government vs. private area, whether place is associated with a brand, chain, or is independent) that have been gathered from multiple sources, verified, and normalized. Advertisements are targeted to users running mobile applications based on a location event shared with the service provider using the quality score for the place indicated in the location event in addition to other attributes of the place. In one embodiment, the system uses a machine learning algorithm to analyze conversion rates of targeted advertising to provide feedback to the scoring model.

22 Claims, 6 Drawing Sheets

LOCATION EVENT ADVERTISING

CROSS REFERENCE TO RELATED APPLICATIONS

This application is a division of U.S. application Ser. No. 13/105,708, filed May 11, 2011, which claims the benefit of U.S. Provisional Application No. 61/333,547, filed May 11, 2010, each of which is incorporated by reference in its entirety.

BACKGROUND

This invention relates generally to software and computer systems, and more specifically, to an advertising system.

Traditionally, advertisers have used geographic location in targeting advertisements in a one-size-fits-all mentality, assuming that users in regions, states, cities, and/or neighborhoods respond to similar types of advertising. For example, users that live in the same zip code as a supermarket may receive advertisements about the supermarket, even if some of those users only shop online for their groceries for organic foods. In this way, the geographic location of those users has been wasted on a supermarket advertisement that is not relevant.

Location-based mobile applications have recently gained popularity among mobile device users. These applications enable users to share their physical locations in real time, providing insight into the daily routines, habits, and favorite places of users of these applications. Although basic demographic information is captured about users of these mobile applications, few advertisers have taken advantage of the location information gathered from these "check-ins," or location events that include a geographic location in real time.

The proliferation of location-based applications has led to duplicate entries for businesses, inaccurate check-ins, and a lack of mechanisms to handle the uncertainty of user-generated places, such as "Casa de Joe." Further, advertisers have been struggling to understand how to utilize this new-found location information. Service providers enabling these check-in events only provide the category of location, such as an entertainment venue, restaurant, or park, basic identification information about the place, such as its address and name, and the number of times users have checked into the place. This limited information does not enable advertisers to target users by location. With millions of people sharing their various physical locations at brick and mortar businesses, parks, landmarks, and even public transit vehicles, advertisers have a goldmine of information about users and the locations they visit, yet mechanisms to effectively target users of mobile applications based on their geographic location have not been devised. Tools and methods are needed to aggregate and normalize these locations and evaluate their potential for being paired with an advertisement.

SUMMARY

Information about physical places is gathered to develop quality scores for targeting advertisements to users of mobile devices sharing geographic location events with service providers. A scoring model incorporates selected attributes about places (e.g., created by a service provider vs. user-generated, category, keywords, census data providing population density by location, property values by area, popularity, special events, government vs. private area, whether place is associated with a brand, chain, or is independent) that have been gathered from multiple sources, verified, and normalized. Advertisements are targeted to users running mobile applications based on a location event shared with the service provider using the quality score for the place indicated in the location event in addition to other attributes of the place. In one embodiment, the system uses a machine learning algorithm to analyze conversion rates of targeted advertising to provide feedback to the scoring model.

Figure 1:
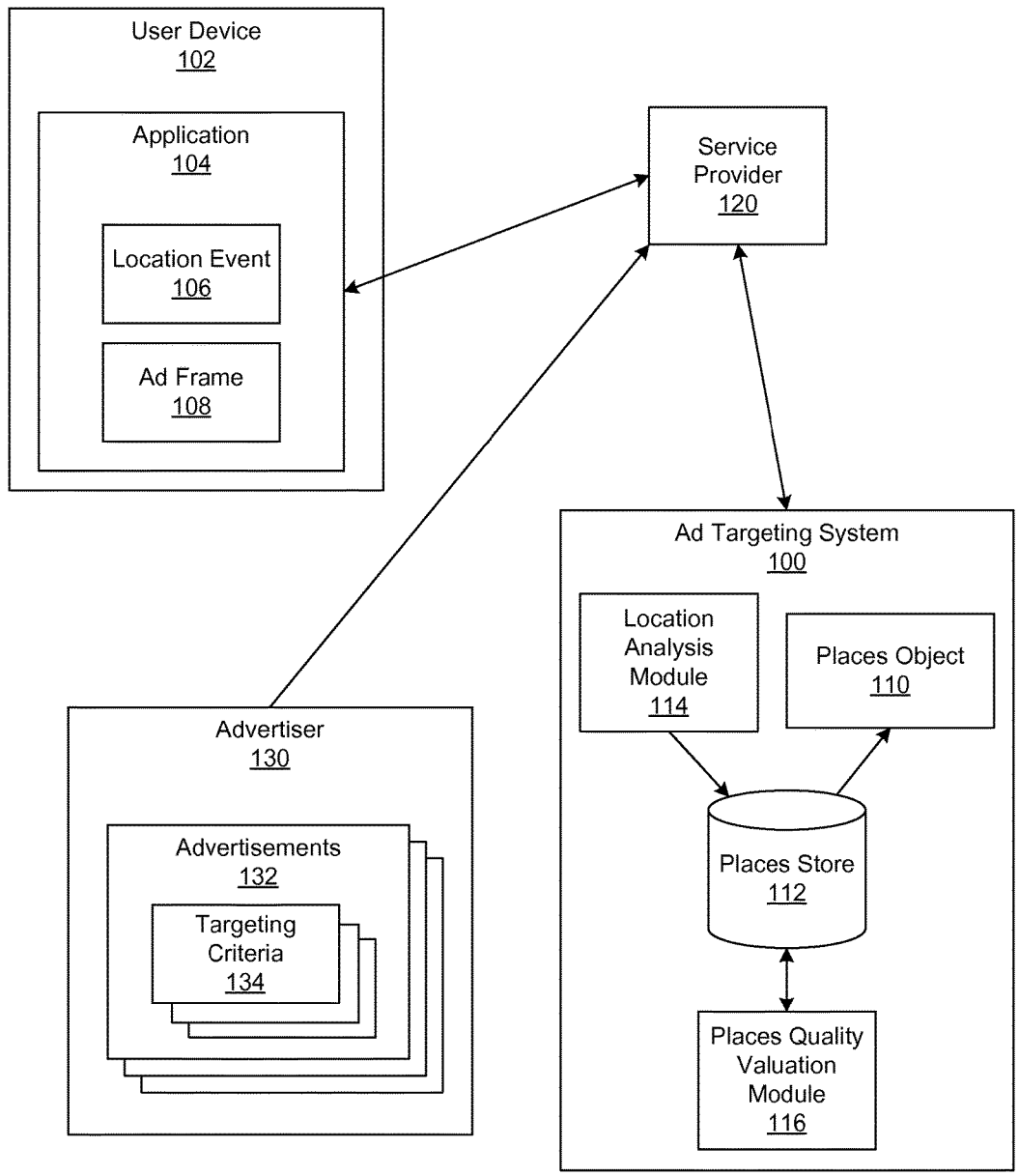
FIG. 1 is a high level block diagram of providing quality scores of places for targeting advertisements, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Location-based mobile applications have recently gained popularity amongst users of mobile devices. Users may "check-in" to their favorite places using a mobile application, effectively sharing location events with other users using the same mobile application and even publicly sharing these location events so that other applications, including social networking systems and search engines, may distribute the shared location event to other users. Location events may include any user interactions with a location, including, but not limited to, checking in at the location, tagging or otherwise referencing a location in a post on a social networking system, and checking into a location implicitly through constantly sharing location coordinates, for example. Mobile devices with GPS location technology have become ubiquitous, allowing location-based mobile applications to flourish.

Service providers hosting these location-based mobile applications have attempted to monetize their applications by selling advertising space within the mobile applications. Ad networks such as AdMob and iAd enable these service providers to receive money from selling "real estate" on their mobile applications, but often the advertisements that are served using these networks are irrelevant to the users of the mobile applications. This problem stems from the lack of understanding how to effectively utilize the location information being gathered by the mobile applications. Ad networks rely on simple targeting criteria, such as demographic data and neighborhood data, to target advertisements to these mobile application users. As a result, conversion rates and click-through rates (CTR) remain low compared to the potential revenue that could be generated if the location information was better utilized by the ad networks to provide more relevant advertisements.

Location events, on their own, provide little information to advertisers to help them craft targeting criteria that utilizes the current location information of users of mobile applications. For example, a mobile application may provide rewards to the user who has generated the most location events at a place, i.e., "checked-in" at the place the most frequently amongst the other users of the mobile application, by giving that user a coupon to the place. However, such a coupon merely serves to increase the number of check-ins at that location and does not provide any information to other advertisers that may wish to advertise something else other than the category of the place being checked-into and demographic information of users. Other mobile applications may create a social game in which users generate location events at places and win points in the game, competing against other users. However, the game aspect, and not the location information, is the primary incentive in advertisers to market to these users.

Service providers of mobile applications provide valuable "real estate" on their applications that have been wasted on largely irrelevant ads. As an analogy, this "real estate" is like a virtual billboard that pops up whenever a user generates a location event. In the real world, billboards are strategically placed on interstate highways to include advertising that is relevant to the driver of the car at the moment they see the billboard, such as a nearby motel or restaurant. Other types of billboards, such as the gigantic LED billboards on Times Square, target affluent visitors of Broadway and high-end luxury boutiques. The virtual billboards on mobile applications have not taken advantage of the location information available about the places where users generate location events, effectively equating Times Square with a stretch of an interstate highway. Different places have different attributes that may be utilized in targeting advertisements on mobile applications.

FIG. 1 illustrates a high-level block diagram of providing quality scores of places for targeting advertisements, in accordance with an embodiment of the invention. An ad targeting system 100 may receive from a service provider 120 location events 106 that were generated from an application 104 running on a user device 102 in order to generate a places store 112. Although only one location event 106 generated by one user device 102 and communicated to one service provider 120 is illustrated in FIG. 1, it is understood that numerous location events 106 may be generated by numerous user devices 102 for multiple service providers 120.

A places store 112 indexes places objects 110 that represent the places in the location events 106 received by the ad targeting system 100. Location events 106 from end user "check-ins" may be collected explicitly by the ad targeting system 100, such as using a mobile application 104, and/or implicitly, such as using navigation equipment or other services for which users interact with to identify places objects 110. Places may be provided real time and/or in batch from a service provider 120. A location event 106 may include any communication from a user device 102 to a system external to the user device 102, such as a service provider 120, that includes a location in the communication. The location communicated to the service provider 120 may include, in one embodiment, a pair of coordinates that include the geospatial position of the user device 102 in longitude and latitude. In another embodiment, the location communicated to the service provider 120 may include a place, an address, or a user generated name of a geographic location. Duplicate places are normalized to one places object 110 in the places store 112. In addition to the first-party data provided by the check-ins, external data may be gathered by the ad targeting system 100 to verify the places objects 110 stored in the places store 112, including licensed third-party data, places listings on social networking systems, business listings, phone directories, national brand store information, census data, public data about government-owned properties, and survey information received from business owners. The gathered information from first party data and third party (external) data include place, category, history, created by, keywords, and other reputation based data such as reviews and certifications. For example, reviews submitted on Yelp, created by Zagat, and City Search may be licensed as third party data, while user-generated data reviewing places during location events may also be utilized as reviews using a heuristic model to extract positive and negative keywords from the reviews.

As data is gathered about a places object 110, a places quality score is generated using a model based on selected attributes of places and the information received about the places. An initial score may be used based on the information available to the ad targeting system 100, using information about the places such as popularity (based on the total number of check-ins, for example), property values, inferred values, and reputation data received from reviews of the places. The score of individual places objects 110 may be adjusted over time as more information is received. In one embodiment, time-sensitive information, such as popularity based on number of location events and reviews of the places, may become less influential on the score according to a time-decay factor applied to the information.

The scoring model may also vary according to the category of the places, in one embodiment. Parks, entertainment venues, hotels, landmarks, coffee shops, restaurants, and national chains may have different scoring models for the places of each category, for example, because different categories of places have different attributes that attract different types of users to generate a location event at those places. A park in a densely populated may be frequented more than a park in a suburb with less population density, for example. As a result, even within the category of parks, the scoring model for those places may vary by other attributes of the places, such as population density. The scoring model allows for granularity in selecting the attributes that affect a quality score of a places object 110. In this way, the ad targeting system 100 may normalize, categorize, and/or score places in a way that makes it easier for an advertiser to understand whether a place is a good match for a particular advertisement. In one embodiment, a service provider may use a quality score to suggest places to an end user (e.g., nearby places having a similar places quality score). In another embodiment, that suggestion may be based upon a selected category, such as entertainment venues. In some embodiments, the suggestion may or may not include an advertisement.

A places quality valuation module 116 in the ad targeting system 100 utilizes the received data about the places objects 110 and generates a quality score for each of the places objects 110. The scoring model may utilize heuristics to analyze a history of location events received about a places object 110. For example, business travelers from around the world attending a conference may generate location events at a particular hotel in rapid succession. The scoring model may utilize heuristics to establish that a special event is occurring and adjust the quality score of a places object 110 accordingly. In one embodiment, machine learning may also be used to train the model based on feedback received from conversion rates and CTRs of advertisements targeted to users based on the quality score of a places object 110. Regression analysis may be utilized by the scoring model, in another embodiment, to identify attributes of places that are better predictors of quality based on the conversion rates and CTRs of targeted advertisements. In yet another embodiment, a linear model may be utilized that weights selected attributes in a formula to calculate a quality score for a places object 110.

After the places objects 110 have been scored by the places quality valuation module 116, a location analysis module 114 may be utilized by the ad targeting system 100 to make available the aggregated and normalized information about the places objects 110. In one embodiment, this information may be licensed to other entities. In another embodiment, the ad targeting system 100 may group places objects 110 into normalized groups for ease of brand advertising purchasing. In yet another embodiment, the ad targeting system 100 may act as an intermediary between advertisers 130 and service providers 120 seeking to more effectively utilize location information in location events 106 for serving advertisements in an ad frame 108 within an application 104 running on a user device 102 in response to a location event 106 being generated. A service provider 120 may be any mobile application provider or other navigation oriented hardware or software provider that provides tools for people to use in the physical world. In one embodiment, the service provider 120 and the ad targeting system 100 may be the same entity, simplifying the process for advertisers 130 wanting to purchase media buys for advertisements 132 that have targeting criteria 134. For purposes of illustration, FIGS. 1-4 distinguish between a service provider 120, an ad targeting system 100 and an advertiser 130, however, a service provider 120 may also be an advertiser 130 desiring to promote the application 104 hosted by the service provider 120, for example.

In some embodiments, an ad targeting system 100 may offer a service provider 120 access to the aggregated and normalized information about places objects 110 for use in an in-house advertising system or for use in a partner advertising relationship via the location analysis module 114. In another embodiment, advertisements 132 may be selected by the ad targeting system 100 based on the information about places objects 110 stored in the places store 112. The location analysis module 114 may provide quality scores to advertisers 130 and/or service providers 120 by score range, by score range and category, or the like. Additionally, the ad targeting system 100 may provide an advertising platform and/or tools for discovery and/or understanding historical patterns for predicting and improving business performance of targeted advertisements 132. The ad targeting system 100 may enable advertisers to define targeting criteria 134 against location, genre, persona (see below), group of locations, location scores, location score tiers, brand matches (see below), categories, and/or the like. The ad targeting system 100 may allow advertisers to purchase advertisements directly or in a pool. In some embodiments, a pool may be based upon a set of relationships between places (e.g., PETE'S COFFEE and APPLE STORE, PETE'S COFFEE and TARGET and COSTCO, and/or the like). In one embodiment, a relationship between places may define a persona.

An ad targeting system 100 may also include a summary of campaign activities, metrics, new campaign ideas, news, trends, click-through rates, and/or the like. Through an interface, the ad targeting system 100 may provide data output to third parties (e.g., publishers, ad networks, agencies, and/or the like), for auditing, enhancement, and/or other similar purposes. An ad targeting system 100, in one embodiment, may allow advertisers to bid to secure rights to places and/or places scores. For example, a high performing place, such as a coffee shop in a busy area of town, may be bid on for the rights to advertising there. In another embodiment, an ad targeting system 100 allows advertisers to establish limits for a price per display, a price per click, overall budget, and/or the like. In some embodiments, an ad targeting system 100 provides functionality for blacklisting of keywords, categories, locations, locations scores, and/or the like to prevent advertisements from being associated with the blacklisted items. In one embodiment, information about places objects 110, such as quality scores and brand attributes, may be made available to the public, enabling an end user to research, plan, sift, and/or otherwise make use of the information for any purpose.

As an example, a small coffee provider may purchase advertising impressions across all national coffee chain locations in a particular city, all weekend, or only in a particular STARBUCKS location for a day. Alternatively, in certain embodiments, an advertiser may purchase advertising for all people who have visited a coffee shop in a particular week that are now at a cinema, all people that visited a major city in a past month, or all people who visit a particular shopping district on a regular basis. As illustrated by this example, targeting criteria 134 for advertisements 132 can be more specific and tailored to the types of places where users are checking in. The ad targeting system 100 provides a more granular approach towards advertising based on location, producing more relevant and timely advertisements to mobile users.

System Architecture

Figure 2:
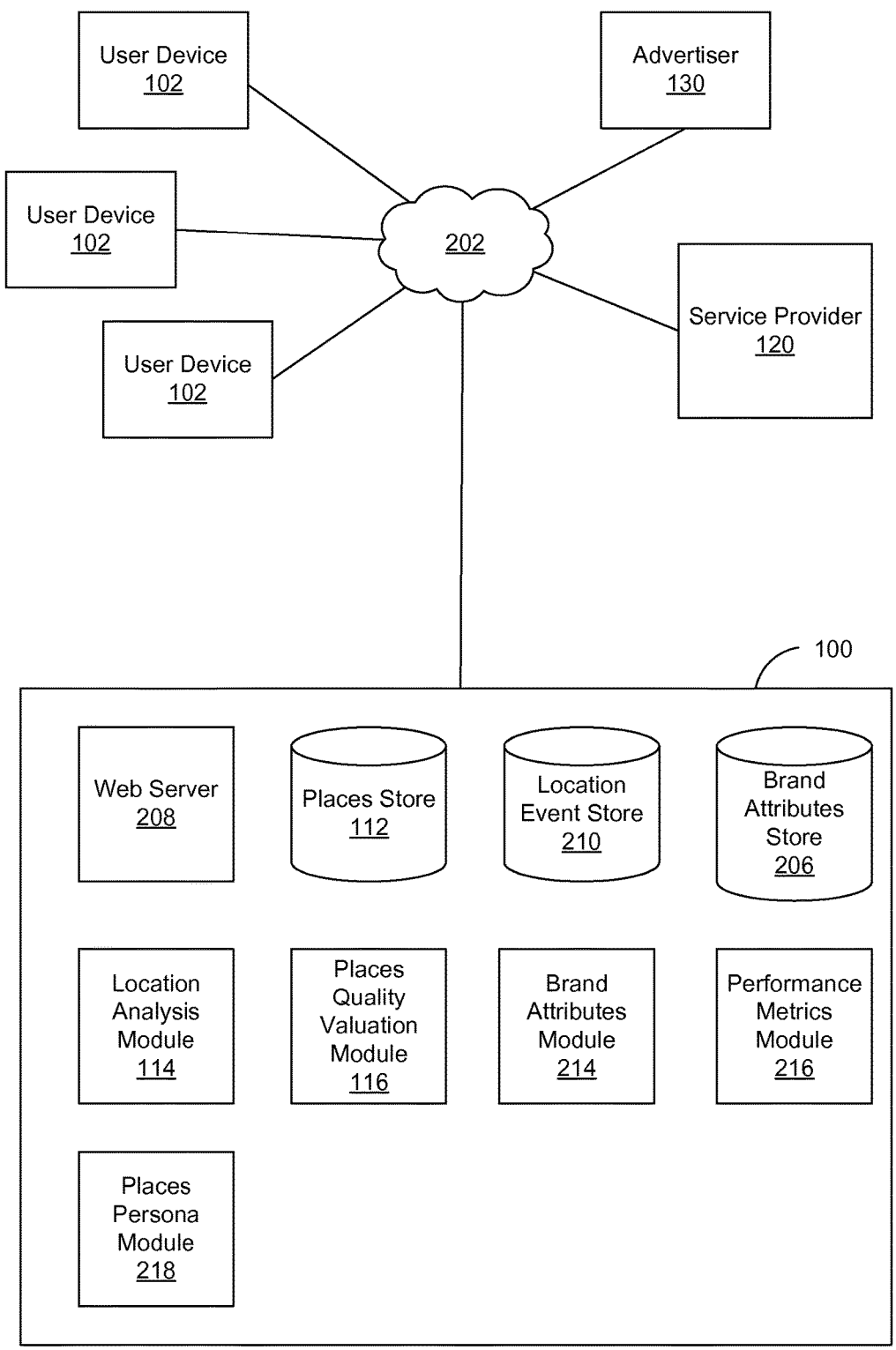
FIG. 2 is a network diagram of a system for providing quality scores of places for targeting advertisements, showing a block diagram of an advertising targeting system, in accordance with an embodiment of the invention.

FIG. 2 is a high level block diagram illustrating a system environment suitable for providing quality scores of places for targeting advertisements to mobile devices, in accordance with an embodiment of the invention. The system environment comprises one or more user devices 102, the ad targeting system 100, a network 202, a service provider 120 and an advertiser 130. In alternative configurations, different and/or additional modules can be included in the system.

The user devices 102 comprise one or more computing devices that can receive user input and can transmit and receive data via the network 202. In one embodiment, the user device 102 is a conventional computer system executing, for example, a Microsoft Windows-compatible operating system (OS), Apple OS X, and/or a Linux distribution. In another embodiment, the user device 102 can be a device having computer functionality, such as a personal digital assistant (PDA), mobile telephone, smart-phone, etc. The user device 102 is configured to communicate via network 202. The user device 102 can execute an application, for example, a browser application that allows a user of the user device 102 to interact with the ad targeting system 100. In another embodiment, the user device 102 interacts with the ad targeting system 100 through an application programming interface (API) that runs on the native operating system of the user device 102, such as iOS 4 and ANDROID.

In one embodiment, the network 202 uses standard communications technologies and/or protocols. Thus, the network 202 can include links using technologies such as Ethernet, 802.11, worldwide interoperability for microwave access (WiMAX), 3G, 4G, CDMA, digital subscriber line (DSL), etc. Similarly, the networking protocols used on the network 202 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 202 can be represented using technologies and/or formats including the hypertext markup language (HTML) and the extensible markup language (XML). Data may also be exchanged over the network 202 using API calls and requests using JavaScript Object Notation (JSON). In addition, all or some of links can be encrypted using conventional encryption technologies such as secure sockets layer (SSL), transport layer security (TLS), and Internet Protocol security (IPsec).

FIG. 2 contains a block diagram of the ad targeting system 100. The ad targeting system 100 includes a places store 112, a web server 208, a location event store 210, a location analysis module 114, a places quality valuation module 116, a brand attributes module 214, a performance metrics module 216, and a places persona module 218. In other embodiments, the ad targeting system 100 may include additional, fewer, or different modules for various applications. Conventional components such as network interfaces, security functions, load balancers, failover servers, management and network operations consoles, and the like are not shown so as to not obscure the details of the system.

The web server 208 links the ad targeting system 100 via the network 202 to one or more user devices 102; the web server 208 serves web pages, as well as other web-related content, such as Java, Flash, XML, and so forth. The web server 208 may provide the functionality of receiving and routing messages between the ad targeting system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

Places objects 110 are stored in the places store 112 after the places quality valuation module 116 assigns quality scores for the places objects 110. A location analysis module 114 enables a service provider 120, an advertiser 130, or a user device 102 to access information about the places objects 110 in response to an API call handled by the web server 208. The location analysis module 114 retrieves places objects 110 corresponding to the information identifying places objects 110 received, including addresses, latitudinal and longitudinal coordinates, names of places, cross streets, zip codes, and other location identifiers. Information about places may be requested via API calls from user devices 102 in conjunction with location events 106, in one embodiment. In another embodiment, the location analysis module 114 provides access to the metadata about the places objects 110 via an interface for external systems, such as service providers 120 and advertisers 130.

Location events 106 received from user devices 102 via the web server 208 may be stored in a location event store 210, in one embodiment. The location event store 210 may only store the location events 106 received over a pre-defined time period, such as the past hour, day, week, or month, for example. The location event store 210 is populated with location events 106 and information about the location events 106, such as historical information about past location events 106 by the same user, service providers 120 associated with the location events 106, and information about how location events 106 were shared or commented on by friends on social networking systems. The places quality valuation module 116 may access the location event store 210 to adjust quality scores of places objects 110 based on this metadata about location events 106.

Place information, including external data and other related information, for a place is stored in the places store 112. The place information stored in places store 112 describes the places in the real world with information that the ad targeting system 100 has received, including category, created by, history, keywords, and textual description, as well as identifying information such as longitude and latitude coordinates, address, membership in groups of places (personas, described below), and the like. The place profile stored in a places object 110 may also store other information provided by the user, for example, images or videos, as well as external data regarding the reputation of the place, such as reviews. In one embodiment, images of places may be tagged with identification information of places objects 110 and stored in the places store 210 in the ad targeting system 100. In that embodiment, a location analysis module 114 may receive a request for information about a place that only includes an image of the place. Image recognition software, external to the ad targeting system 100, may then be used in conjunction with the location analysis module 114 to identify the places object 110 in the places store 112 that corresponds to the place in the image. The places store 112 may also store references to multiple location events 106 stored in the location event store 210 that include places objects 110, in another embodiment. These references would be stored in the corresponding places objects 110. For example, if Bob, Dan, and Michael check into the same Starbucks coffee shop, references to those location events 106, even if created on separate applications 104 supported by different service providers 120, are stored in the places object 110 for the Starbucks coffee shop.

A brand attributes module 214 associates brand attributes with places objects 110 based on quality scores and other information about the places. Brand attributes include literal and figurative descriptions of brands, such as age appeal, sex appeal, conflicts, categories, places, ephemerals (e.g., fresh air, park, fun), locations, location radiuses, black lists, times, weather, and/or other similar attributes). For example, Britney Spears is a pop singer that has released Top 40 songs, dance remixes, and collaborations with other pop artists. Thus, her literal brand attributes may include "pop music," "dance music," "Top 40," "female singer," and so on. However, Britney Spears may also have other brand attributes that are figurative descriptions of her brand, such as "fun," "party," "teen idol," and "fresh." Both traditional and non-traditional brand attributes may be stored in a brand attributes store 206. These brand attributes may be generated by advertisers 130, ad agencies, and administrators of the ad targeting system 100, in one embodiment. In another embodiment, brand attributes may be extracted from keywords in advertisements 132 for brands using heuristic methods. Brand attributes may similarly be associated with places objects 110 by the brand attributes module 214 in conjunction with the places quality valuation module 116 based on the quality score assigned and other information gathered from location events 106 and third-party data regarding reviews of the places using heuristic methods to extract brand attributes from the reviews. In a further embodiment, brand attributes may be assigned to places objects 110 based on quality score alone by the brand attributes module 214. In one embodiment, brand attributes may be manually assigned to places objects 110 via a user interface rendered on an application 104 on a user device 102 to enable a user to specify brand attributes that describe the place included in a generated location event 106. In yet another embodiment, an interface enables third-parties, such as advertisers, to manually assign brand attributes to places objects 110 with the brand attributes module 214. Brand attributes may also be assigned to categories of places objects 110 using the brand attributes module 214. For example, "fun" may be assigned to all amusement parks, recreational venues, and concert events. Brand attributes are stored in a brand attributes store 206. If a place or persona (group of places) is assigned a brand attribute, a reference to the brand attribute is stored in the places object(s) 110 for the place or persona.

A performance metrics module 216 tracks conversion rates and click-through rates (CTRs) of advertisements that have been targeted utilizing information about places objects 110, including quality scores and brand attributes, to provide feedback regarding quality scores and brand attributes assigned to places objects 110. Performance metrics data may be utilized by a machine learning algorithm to train the places quality score model, in one embodiment. In another embodiment, performance metrics data may be visualized in an executive dashboard user interface provided by the ad targeting system 100 for advertisers 130 and service providers 120 to track the progress of ad campaigns and measure the reach of ad buys. Performance metrics for places would be stored in corresponding places objects 110 in the places store 112 by the performance metrics module 216, in one embodiment.

A places persona module 218 enables grouping of places objects 110 to create a "persona" of places. A "persona" may be defined as a grouping of places objects 110 by an administrator of an ad targeting system 100 or by advertisers 130. A persona may reference a brand image that are embodied in places objects 110, such as premium brands like "Target," "Peet's Coffee," and "Apple" as differentiated from mainstream brands like "Walmart," "Starbucks," and "Dell." Personas enable simple purchasing of ad space during location events 106 at one of the places in the persona. The places persona module 218 may receive grouping from advertisers, in one embodiment, and store the persona information in the places objects 110 for the persona. For example, "Target," "Peet's Coffee," and "Apple Store" may be identified as one persona by an advertiser 130 seeking to advertise to users that have generated location events at those brands. In another embodiment, a "persona" may be all places that are associated with a specific national brand, such as "Starbucks." Thus, a persona indicator would be stored in the places objects 110 for all Starbucks locations. Personas may also be extracted from the location events 106 received from service providers 120 using heuristic methods to identify common patterns. In analyzing the location events 106, a new persona may be discovered, or "surfaced," based on tracking the histories of location events 106 of users. It might be discovered, for example, that users who generate location events 106 at parks also generate location events 106 at gyms. Thus, the genres of parks and gyms may be linked as a persona. The places persona module 218 may also utilize external data about places, such as reviews, to surface patterns in location events 106 that may necessitate a new persona, in one embodiment.

Scoring Places Using a Model for Targeting Advertisements

Figure 3:
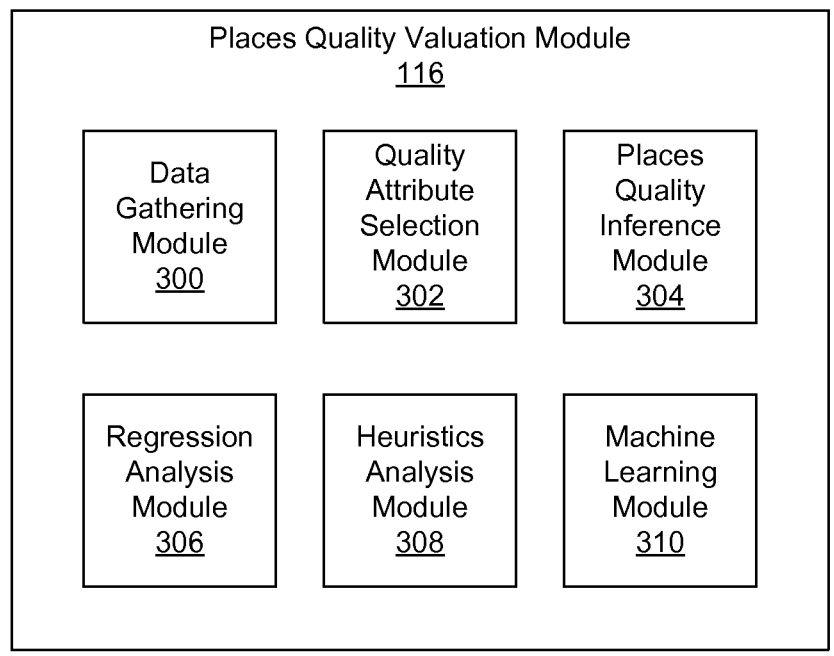
FIG. 3 is a high level block diagram illustrating a places quality valuation module that includes various modules for scoring places for targeting advertisements, in accordance with an embodiment of the invention.

FIG. 3 illustrates a high level block diagram of the places quality valuation module 116 in further detail, in one embodiment. The places quality valuation module 116 includes a data gathering module 300, a quality attribute selection module 302, a places quality inference module 304, a regression analysis module 306, a heuristics analysis module 308, and a machine learning module 310. These modules may perform in conjunction with each other or independently to develop a scoring model for places used for targeting advertisements in an ad targeting system 100.

A data gathering module 300 receives information about places from service providers 120 in the form of location events that may be received in real-time, in batches, or in bulk. These location events include information about the place, including (1) location; (2) whether location is service provider or user created; (3) category (e.g., home, nightlife, parks & outdoors, or the like); (4) keywords (e.g., my favorite COFFEE shop, place where I get my SURFBOARD fixed, or the like); (5) deduced context information such as when specific location is not identified (e.g., based upon historical locations, location trends, pathway predicted locations, applications such as GOOGLE's NEAR ME NOW or GOOGLE LOCAL, queries such as 'what's fun around me or places to play soccer, or the like); and/or other similar data.

The data gathering module 300 interfaces with external websites to process information about places objects 110 stored in the ad targeting system 100. This information may include ComScore data, Nielsen data, Yelp reviews, census data, information about property values and rents, and other data licensed from third party providers. The data gathering module 300 also receives information about places from social networking systems, property listings, and external websites. Information from social networking systems may include social interactions with places, such as commenting on location events 106, sharing places with other users of the social networking system, and commenting on places stored as nodes, or non-person entities, in the social networking systems. In one embodiment, the ad targeting system 100 may include a social networking system. Third party information about a place may be incorporated into a places object 110 for that place, including one or more of the following: (1) YELP data (e.g., business review and rating information, accurate neighborhood name information, and/or the like); (2) NIELSEN data (e.g., income levels and/or the like); (3) CITYSEARCH data (e.g., review and rating information and/or the like); (4) FACEBOOK data (e.g., number of fans, listing existence, and/or the like); (5) self-reported data (e.g., input provided by location owner, curator, keeper, and/or the like); and/or other similar information.

The data gathering module 300 also receives location events 106 from service providers 120. User devices equipped with global positioning systems (GPS) provide longitude and latitude coordinates to the ad targeting system 100. Alternatively, geographic location of a user device 102 that is equipped with wireless communication functionality may be obtained from the cell towers that the user device interacts with. The location of a user device may be determined based on the internet protocol (IP) address associated with sessions created by the user device. Various communication protocols provide an IP address of a user device used to establish communication with a server in the ad targeting system 100. The IP address of the user device can be mapped to geographical location of the machines using the IP address. As a result, the geographical location of the user device can be determined for the places quality valuation module 116 to assign quality scores to places objects 110.

The data gathering module 300 may receive duplicative information about places. For example, multiple location events 106 may include references to "McDonalds," "McDonald's," and "McDonalds—Mission St. at 24th St." even though only one restaurant named McDonald's is being referenced. De-duping the location events and normalizing the place objects 110 is achieved by heuristics analysis module 308, described below.

The data gathering module 300 generates a places object 110 for each normalized place represented by the received location events 106. In one embodiment, the data gathering module 300 may verify whether a place is and/or similar to that an existing places object 110 before generating a new places object 110, such as by verifying an address, a latitude and longitude, or the like. When unable to verify a place, the data gathering module 300 relies on another identifier such as a category and/or keyword (e.g., when a location is "on the bus", "playing golf", or "going for a swim").

Various types of information may be gathered by the data gathering module 300, such as location events from user devices utilizing mobile applications, as well as third-party data that includes reviews about places on social networking systems, review websites, travel guides, and other sources of information. Keywords may be extracted by the data gathering module 300 to better understand the places being mentioned in the location events and reviewed in the third-party data. In some embodiments, a specific place may not be provided by service providers. For example, a service provider may provide a history of recent location events but not the specific place that a user is currently located. This historical location information may be analyzed by other modules, such as the location analysis module 114 to decide what kind of advertisement should be shown to the user. As another example, a map application on a mobile device or an in-car navigation system may act as service providers, indicating a geographic location of a user device without context. In this instance, the user device may not be at a specific place, but may be near some places that are represented as place objects 110 in the ad targeting system 100. The location analysis module 114 may utilize this information gathered by the data gathering module 300 to determine what types of advertisements might be appropriate to display to the user.

In one embodiment, the data gathering module 300 may also receive information passed along by a service provider 120 that includes a selection of a link by users requesting searches for "fun things to do near San Francisco," "places to play soccer," or implicit searches like a "Near Me Now" feature in which the service provider is fulfilling the request based on location from a directory. In such an instance, the data gathering module 300 does not know the place of the user device, but has some limited information of categories of information being requested and a geographic location.

A quality attribute selection module 302 selects the quality attributes used in a model to calculate a quality score for places objects 110. Various quality attributes may be extracted by the quality attribute selection module 302 from the data gathered about places objects 110 by the data gathering module 300. The selection of quality attributes may be manually selected by administrators of the ad targeting system 100, in one embodiment. In another embodiment, quality attributes may be selected to be used in a model based on performance metrics that are used to train the model. In yet another embodiment, the selected quality attributes may meet certain quotas of fulfilling ad capacity. Such quality attributes include population density of the area surrounding the place, how close to a population center is the place, the per square foot rents or other value based metrics in the area of the place, whether the place is a brand, chain, or independent location, government site, outdoor space, open park, recreation center, tennis courts, playing fields, etc., any special events occurring currently at the place such as Mardi Gras, New Year's Eve, and the popularity of the place. Popularity may be measured in the number of location events at the place, in one embodiment. In another embodiment, popularity may be measured in terms of trends, meaning how popular is the place currently versus how popular the place was in the past. Different categories of places objects 110 may have different quality attributes selected for the models that determine the quality scores for those categories of places objects 110.

In another embodiment, a data gathering module 300 may receive social information attached to location events 106. Social information may include other users of the application 104 hosted by a service provider 120 that have been "tagged" or otherwise identified by the user device 102 by the user. This type of social information may be utilized by the ad targeting system 100 to identify groups of places associated with the user, such as locations where the user has been.

A places quality inference module 304 infers attributes about places based on their proximity to other places. For example, if a places object 110 is in close proximity to other places objects 110, the quality attributes of those places objects 110 may be transferred to the places object 110. As an example, a dry cleaners business may not be a place that generates many location events, and information about that place may be limited. However, that place may be geographically surrounded by high-end restaurants and entertainment venues that indicate quality attributes should be inferred for the dry cleaners business, such as high-income and high-property value. In one embodiment, specified quality attributes may be inferred for places, such as property values, population density of area surrounding the place, and special events occurring in the geographic region.

In one embodiment, the regression analysis module 306 uses a regression model to determine quality scores for places objects 110 stored in the ad targeting system 100. Each category of places uses a separate regression model that may utilize different quality attributes. For example, a category of places may be defined as high-end places with high-income customers. The quality attributes for each category are selected by the quality attribute selection module 302. The regression analysis module 306 may also add or remove quality attributes based on the performance of advertisements directed to users generating location events in a place represented by a places object 110. As an example, suppose that a user device generates a location event by checking in to the Four Seasons Hotel in NYC. If that user device is targeted with advertisements for destination travel packages, luxury cars, and home mortgages, but explicitly declines each of those advertisements, the quality attributes that were selected to categorize the Four Seasons Hotel in NYC may be modified manually by administrators or by the quality attribute selection module 302. Similarly, the quality attributes of one of the categories that the Four Seasons Hotel in NYC may be grouped under, the high-end category mentioned above, may be modified to included more or less quality attributes based on the performance metrics, in one embodiment.

Using a combination of the quality attributes, the regression model for each category of places assigns a coefficient to each of the quality attributes based on the probabilistic distribution of reviews of places gathered from licensed data and extracted from location events, i.e., the response. The regression analysis module 306 then determines a score that indicates whether a place is a good fit with a category of places. A curve fit, or best fit, yields a number from 0 to 1 that can be used as the accuracy measurement of the category of places, in one embodiment. The regression analysis module 306, in one embodiment, adapts the regression model to include or exclude attributes that are determined to be relevant or not relevant in scoring places for quality based on machine learning and heuristics analysis of location events and other information gathered by the data gathering module 300.

A heuristics analysis module 308 operates independently and asynchronously from the other modules in the places quality valuation module 116. The heuristics analysis module 306 performs various steps to analyze information gathered by the ad targeting system 100. For example, location events may be shared by a service provider 120 with a social networking system in addition to an ad targeting system 100. The heuristics analysis module 308 may be used to analyze the level of communications activity regarding particular places and determine whether those communications included certain keywords that may be relevant in accessing the quality of places. Such communications activity may include comments on a check-in on the social networking system made accessible by the service provider 120, reviews posted on public review websites such as Yelp and CitySearch, and other third-party gathered by the data gathering module 300.

Another use of the heuristics analysis module 308 includes gathering and analyzing different types of information about a historical pattern of location events by users of service providers, including check-ins at places in a specific geographic location, checking in to events in the same geographic region, and geo-location codes embedded in photos and other communications, such as text messages, uploaded to the ad targeting system by the service provider. The heuristics analysis module 308 may deduce, for example, that groups of users that frequently attend events in an affluent community such as Atherton, Calif. and shares check-ins at high-end boutique shops in Palo Alto, Calif. have expensive tastes in the places where they choose to generate location events. An inference may be made that users who attend events in affluent communities and posts check-ins frequently at high-end shops may help infer attributes about all of the places that those users visit. Thus, these users may be thought of as "taste makers" in the sense that the places where they generate location events may be given additional weight in calculating the quality score for those places.

Bursts of activity related to users in a specific geographic location, for example, can be detected by the ad targeting system 100 and identified by a heuristics analysis module 308. For example, it could be assumed that parades only occur in high quality score places. Thus, if the word "parade" occurs in a burst of location events 106 in certain geographic region, this could be interpreted by the heuristics analysis module 308 as a special event that may be valuable to advertisers because of the number of people likely to check-in to the parade. The specific geographic locations where parades might be expected to occur, for example, could be predetermined from external data gathered from a third party website that identifies major parade routes by geographic location. Bursts of activity can be detected by normatively scoring the location events against past empirical data measuring such bursts of activity on the ad targeting system 100. A specific normative threshold of expected activity may be generated for special events, such as parades, celebrations, and marathons. Certain exceptions may be made, depending on the usage of the keyword, in one embodiment. For example, a location event with a message "Don't rain on my parade!" does not imply that the user generating the location event is in an actual parade. Language processing tools may be used to analyze location events to determine whether a special event is occurring. Utilizing heuristic methods to analyze unstructured information enables better information to emerge about places objects 110 for computing quality scores and assigning brand attributes.

A machine learning module 310 may be used in the places quality valuation module 116 to refine the predictive regression models and the quality attributes selected for each category of places. In one embodiment, an ad targeting system 100 uses a machine learning algorithm to analyze the conversion rates and click-through rates (CTRs) of targeted advertising to retrain the scoring model. Using feedback from the conversion rates and CTRs of targeted advertising, the scoring model may be refined to include more or less quality attributes and the weights assigned to each quality attribute, or coefficients, can also be adjusted based upon the response, i.e., the conversion rates of a sampling of the targeted users.

The places quality valuation module 116 may, in one embodiment, score places for targeting advertisements utilizing a scoring model that relies on a weighted function that creates a score based on quality attributes. For example, a coffee shop that is very close to the population center of a city and close to highly-valued properties may be given a high quality score. The scoring model may weight certain attributes over other attributes to create a score for a places object 110. Scores may fluctuate to reflect performance metrics and feedback received by the ad targeting system 100 in a real-time basis, in one embodiment. In another embodiment, the scores may be recalculated periodically.

Figure 4:
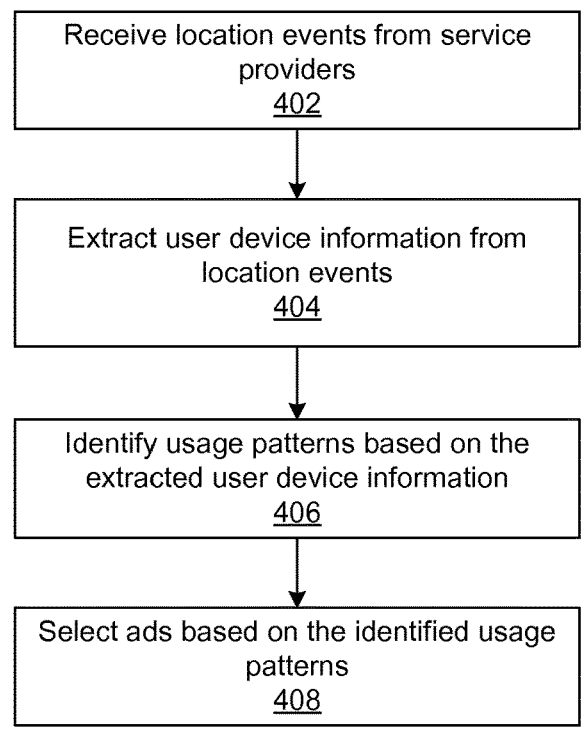
FIG. 4 is a flowchart of a process for selecting ads based on identified usage patterns of location events by users, in accordance with an embodiment of the invention.

FIG. 4 illustrates a flowchart of selecting ads based on identified usage patterns of location events of users, in accordance with an embodiment of the invention. Location events are received 402 from service providers that include user device identifying information and places represented by places objects 110 in the ad targeting system 100. The user device information is extracted 404 from the received location events. In one embodiment, the user device information is stored in a data store on the ad targeting system 100. Usage patterns are identified 406 based on the extracted user device information using various methods, including heuristics, distribution models, and other data modeling techniques. Ads are then selected 408 based on the identified usage patterns. For example, an advertiser 130 may want to advertise to users that have checked in to a Starbucks location at least three times in the past week on their next check-in, or generation of a location event, regardless of the place where they are checking in. Usage patterns may also identify personas, as described above and in regards to FIG. 3.

Figure 5:
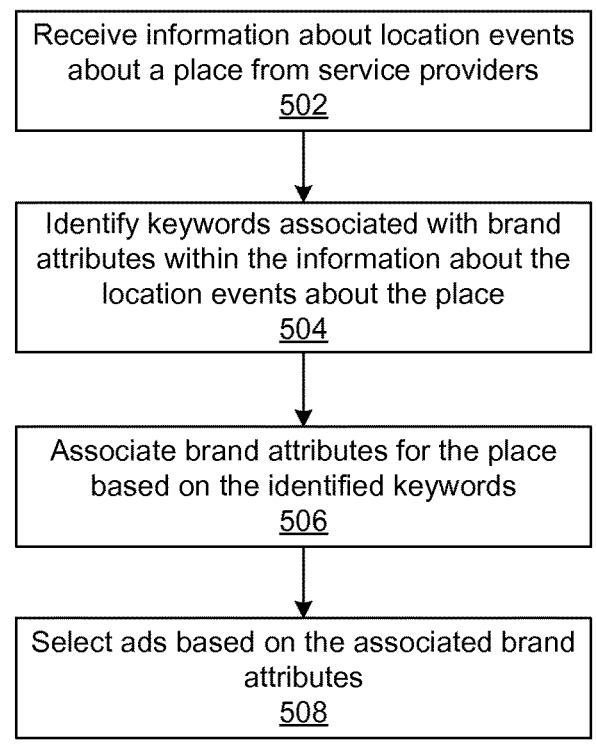
FIG. 5 is a flowchart of a process for selecting ads based on brand attributes associated with places, in accordance with an embodiment of the invention.

FIG. 5 is a flowchart of a process for selecting ads based on brand attributes for places, in accordance with an embodiment of the invention. In addition to location events about a place received from service providers by the ad targeting system, information about the location events about a place are received 502. Such information may include social information, such as other users included in the location event, comments from users of a social networking system about the location event, reviews from users of a service provider about the place in conjunction with the location event, and descriptive information submitted by owners of the place that appears on the application as the user device generates a location event. Keywords associated with brand attributes are identified 504 within this received information about location events about a place. Brand attributes such as age appeal, sex appeal, and ephemeral brand attributes (e.g., fun, flirty, exciting, and the like) may be associated with certain keywords generated by advertisers, ad agencies, ad networks, and the like. Based on the identified keywords in the information about location events about a place, brand attributes are associated 506 for the place. This association may be performed via various methods, including heuristics, regression analysis, and machine learning, to identify brand attributes that describe the place. Ads can then be selected 508 based on the associated brand attributes of the place.

Figure 6:
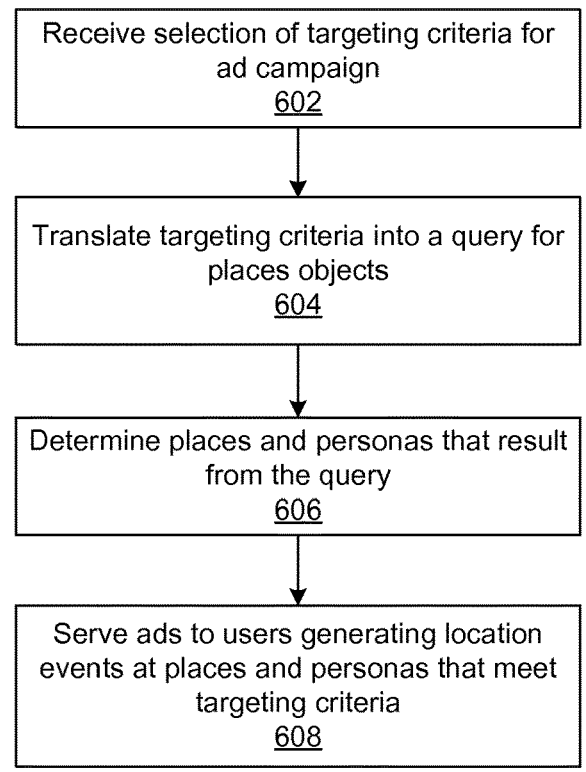
FIG. 6 is a flowchart of a process for serving ads to users generating location events at places based on selected targeting criteria, in accordance with an embodiment of the invention.

FIG. 6 is a flowchart of a process for serving ads to users generating location events at places based on selected targeting criteria, in accordance with an embodiment of the invention. A selection of targeting criteria is received 602 for an ad campaign from an advertiser 130. Advertisers may select targeting criteria by utilizing a user interface on a user device communicating with the ad targeting system 100 via the network 202. Targeting criteria may be based on quality scores, quality score ranges, personas, brand attributes, usage patterns identified from historical location event information, and combinations of the above. The selection of targeting criteria is translated 604 into a query for places objects 110 that satisfies the targeting criteria. The query resulting from the translation may be in the form of API calls to the ad targeting system 100, in one embodiment. In another embodiment, the query may be in a structured query language to be executed on the places store 112. Places and personas are determined 606 based on the query. Ads are then served 608 to user devices that generate location events at the places and/or personas determined from the query.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a location event from a user device, the location event identifying a geographical location;
   determining, by a computer system, attributes for the geographical location identified by the location event to serve as targeting criteria for advertisement selection;
   storing the attributes in a places object for the geographical location;
   calculating, by a computer system, a quality score for each places object, the quality score calculated based on the stored attributes about the geographical location, the calculating comprising:
      defining a scoring model that includes selected of the attributes for the geographical location as weights in the scoring model; and
      scoring the places object using the scoring model;
   selecting an advertisement for the user based on the quality score for the geographical location; and
   serving the advertisement to the user.

2. The method of claim 1, wherein the attributes for the geographical location identified by the location event to serve as targeting criteria for advertisement selection comprise one or more selected from quality scores, quality score ranges, brand attributes, usage patterns, and personas.

3. The method of claim 1, further comprising:
providing the attributes for the geographical location identified by the location event to serve as targeting criteria for advertisement selection to a system external to the computer system.

4. The method of claim 1, further comprising:
extracting by a computer system information about the geographical location from the location event; and
for the geographical location, storing the extracted information about the geographical location in a places object.

5. The method of claim 1, wherein calculating the quality score for the places object comprises retrieving the quality score from a places store.

6. The method of claim 1, wherein the attributes for the geographical location identified by the location event comprise a brand attribute for the places object, and wherein the advertisement selected for the user is selected based on the brand attribute.

7. The method of claim 6, further comprising:
extracting information about the geographical location identified by the location event, the information comprising one or more keywords, wherein the brand attribute is identified based on the one or more keywords.

8. The method of claim 1, wherein the attributes for the geographical location identified by the location event comprise a usage pattern for the places object, and wherein the advertisement selected for the user is selected based on the usage pattern.

9. The method of claim 1, wherein the attributes for the geographical location identified by the location event comprise a usage pattern, and wherein determining the attributes for the geographical location identified by the location event further comprises:
maintaining a plurality of places objects, each identifying a geographical location;
identifying usage patterns for selected geographical locations based on analysis of the places objects; and
storing the usage patterns for the selected places objects, wherein the stored usage patterns comprise the usage pattern for the geographical location identified by the location event.

10. The method of claim 1, further comprising:
identifying a threshold number of location events at the geographical location identified by the location event, wherein the advertisement selected for the user is based on whether the user is associated with at least the threshold number of location events at the geographical location, and wherein the attributes for the geographical location identified by the location event comprise a usage pattern and the targeting criteria for advertisement selection comprises the usage pattern.

11. The method of claim 1, wherein selecting the advertisement for the user based on the attributes for the geographical location further comprises:
receiving a selection of targeting criteria comprising selected of the attributes; and
determining a candidate set of advertisements having the selected attributes.

12. The method of claim 11, further comprising:
serving the advertisement to the user.

13. The method of claim 1, further comprising:
determining a nearby geographical location in close proximity to the geographical location identified by the location event; and transferring the attributes for the geographical location identified by the location event stored in a places object for the geographical location to a places object for the nearby geographical location.

14. The method of claim 1, wherein the geographical location identified by the location event is a user-generated place.

15. The method of claim 1, wherein the geographical location identified by the location event is identified using longitude and latitude coordinates.

16. A method comprising:
receiving a location event from a user device, the location event identifying a geographical location;
determining, by a computer system, a quality score for the geographical location identified by the location event, the quality score comprising information and selected attributes about the geographical location, the quality score stored in a places object for the geographical location;
in response to the quality score for the geographical location being below a threshold, determining a nearby geographical location in close proximity to the geographical location identified by the location event, the quality score for the nearby geographical location being above the threshold;
replacing the quality score for the geographical location with a quality score for the nearby geographical location; and
selecting an advertisement for the user based on the quality score for the nearby geographical location.

17. The method of claim 16, wherein determining the quality score for the geographical location further comprises retrieving the quality score from a places store.

18. The method of claim 16, further comprising:
determining attributes for the geographical location, the attributes comprising the quality score for the geographical location, the determining comprising:
defining a scoring model that includes selected of the attributes as weights in the scoring model; and
scoring the geographical location using the scoring model.

19. A method comprising:
receiving location events from user devices, each location event identifying a geographical location;
extracting information about the geographical locations from the location events;
for each geographical location:
storing the extracted information about the geographical location in a places object;
calculating, by a computer system, a quality score for each places object, the quality score calculated based on the information about the geographical location stored in the places object and selected attributes about the geographical location, the calculating comprising:
defining a scoring model that includes selected of the attributes for the geographical location as weights in the scoring model; and
scoring the places object using the scoring model;
in response to receiving a location event from a user for a geographical location, associating the geographical location with a corresponding places object for that geographical location;
determining a quality score for the geographical location identified by the location event based on the quality score for the corresponding places object;

selecting an advertisement for the user based on the quality score for the geographical location; and serving the advertisement to the user.

20. The method of claim 19, further comprising:

in response to the quality score for the geographical location identified by the received location event being below a threshold, determining a nearby geographical location in close proximity to the geographical location identified by the received location event, a quality score for the nearby geographical location being above the threshold;

replacing the quality score for the geographical location with the quality score for the nearby geographical location; and selecting an advertisement for the user based on the quality score for the nearby geographical location.

21. The method of claim 19, further comprising:

determining the quality score for the places object by retrieving the quality score from a places store.

22. The method of claim 19, wherein the places object comprises aggregated, normalized information about a plurality of location events for the same location.

* * * * *